(12) United States Patent
Walter et al.

(10) Patent No.: US 7,738,368 B2
(45) Date of Patent: Jun. 15, 2010

(54) VOICE OVER INTERNET PROTOCOL CODEC ADJUSTMENT

(75) Inventors: Edward Walter, Boerne, TX (US);
Matthew Bruening, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1166 days.

(21) Appl. No.: 11/271,489

(22) Filed: Nov. 10, 2005

(65) Prior Publication Data

US 2007/0104185 A1 May 10, 2007

(51) Int. Cl.
*H04L 12/56* (2006.01)
(52) U.S. Cl. .................................. 370/230; 370/356
(58) Field of Classification Search ............... 370/352, 370/356, 229–232, 235–237, 225–228, 401, 370/468, 477
See application file for complete search history.

(56) References Cited

U.S. PATENT DOCUMENTS

| | | | |
|---|---|---|---|
| 6,445,697 B1 * | 9/2002 | Fenton | 370/357 |
| 6,751,477 B1 * | 6/2004 | Alperovich et al. | 455/560 |
| 6,754,232 B1 | 6/2004 | Tasker | |
| 6,801,604 B2 | 10/2004 | Maes et al. | |
| 6,804,254 B1 | 10/2004 | Pearce et al. | |
| 2003/0012137 A1 | 1/2003 | Abdelilah et al. | |
| 2003/0016807 A1 | 1/2003 | Otsuka | |
| 2003/0063569 A1 * | 4/2003 | Kalliokulju et al. | 370/252 |
| 2003/0123388 A1 | 7/2003 | Bradd | |
| 2003/0189900 A1 * | 10/2003 | Barany et al. | 370/229 |
| 2004/0002339 A1 | 1/2004 | O'Connor | |
| 2004/0264482 A1 * | 12/2004 | Kang et al. | 370/401 |
| 2005/0015253 A1 * | 1/2005 | Rambo et al. | 704/246 |
| 2005/0052996 A1 | 3/2005 | Houck et al. | |
| 2005/0091392 A1 | 4/2005 | Gesswein et al. | |
| 2006/0094472 A1 * | 5/2006 | Othmer et al. | 455/563 |

OTHER PUBLICATIONS

JP 2005-260649 (machine translation) Kakimoto Masafumi, "Radio Telephone Set", Sep. 22, 2005.*

* cited by examiner

*Primary Examiner*—Min Jung

(57) ABSTRACT

A system for changing the coder-decoder utilized during a voice over Internet protocol telephone call is disclosed. The system includes two local area networks connected to each other via a wide area network. Each local area network includes a router connected to the wide area network, a switch connected to the router and a voice over Internet protocol telephone connected to the switch. The voice over Internet protocol telephones are configured to detect when voice packets are being dropped and utilize a lower bandwidth coder-decoder.

12 Claims, 4 Drawing Sheets

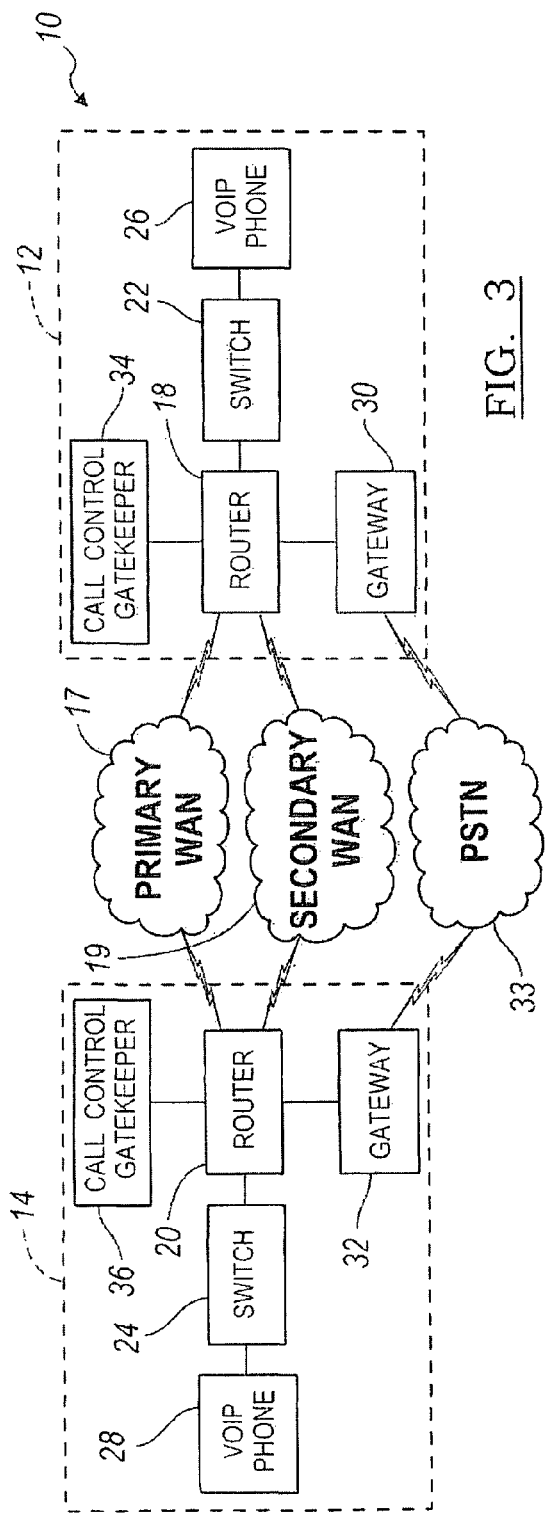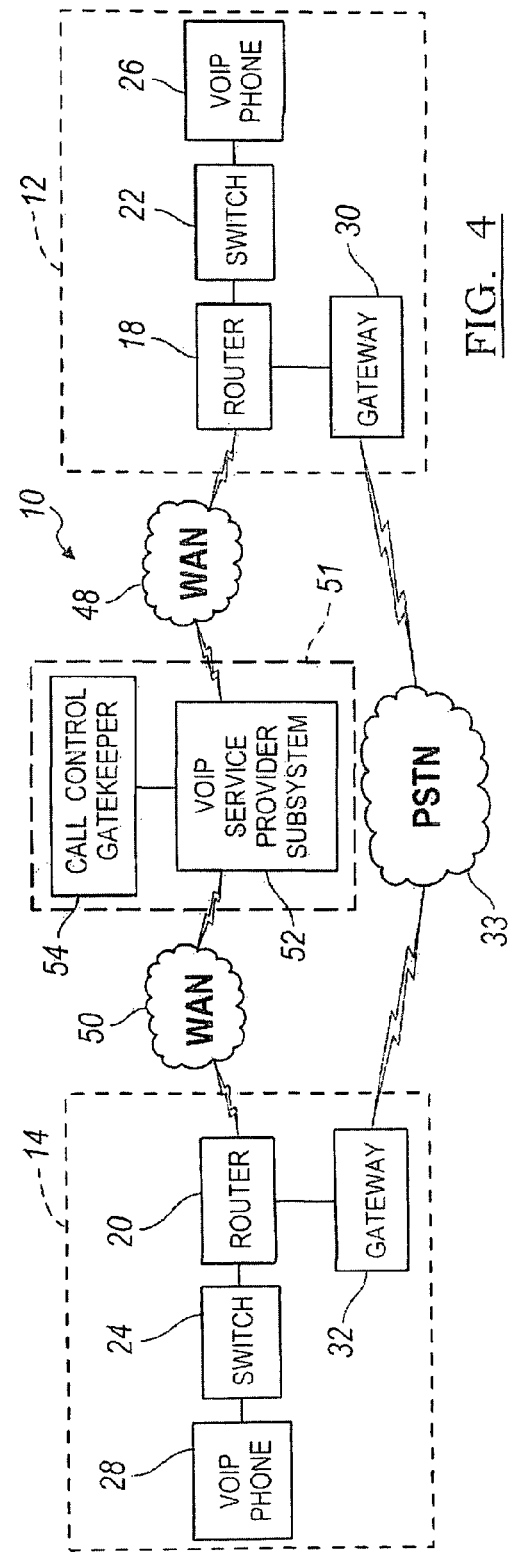

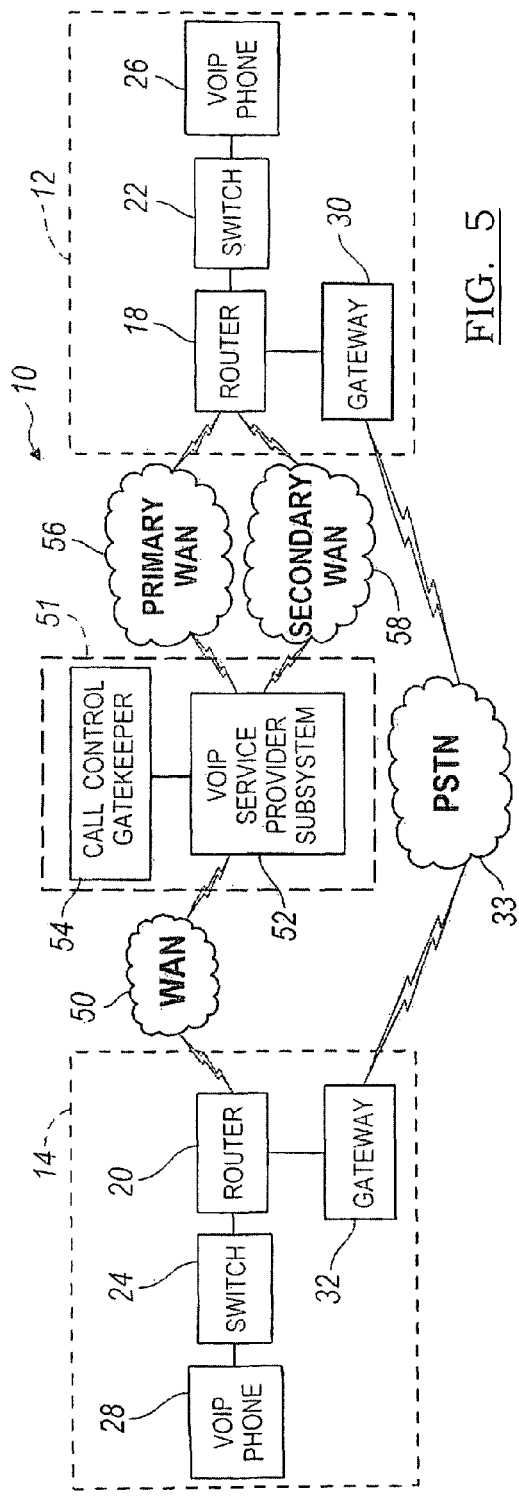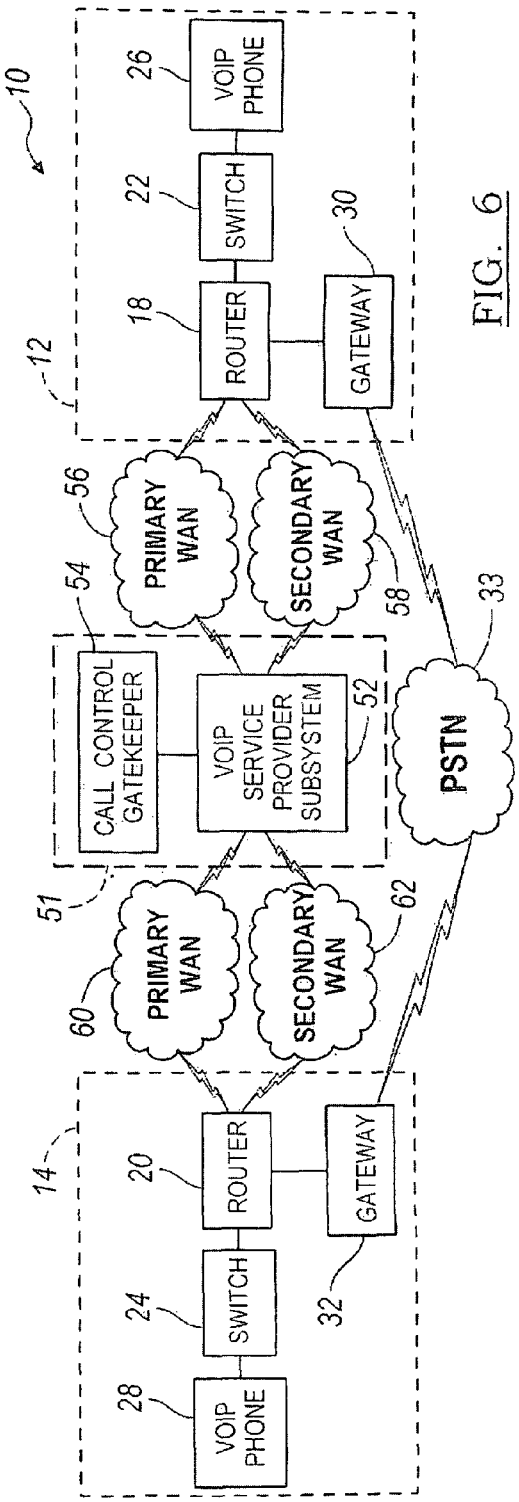

VOICE OVER INTERNET PROTOCOL CODEC ADJUSTMENT

TECHNICAL FIELD

The present disclosure generally relates to voice over internet protocol ("VoIP") telephone systems.

BACKGROUND

VoIP applications that utilize internal data networks are becoming more prevalent. Typically, VoIP is deployed across a broad network infrastructure including local area networks ("LAN") and wide area networks ("WAN") which serve to connect the LANs to each other. The quality and reliability of VoIP depends on the underlying network's capabilities and limitations. As more network traffic travels between LANs via the WAN, including VoIP telephone calls, the amount of available bandwidth for making additional VoIP telephone calls becomes limited.

When the available bandwidth of the WAN is reduced such that the bandwidth remaining is inadequate to transmit a VoIP telephone call, previous solutions would simply prevent any new VoIP telephone calls from being placed. Therefore, there exists a need for a system that can allow additional VoIP telephone calls to be placed when the available bandwidth of the WAN is reduced below a desired level.

BRIEF DESCRIPTION OF THE DRAWINGS

FIG. 3 is a block diagram of a second embodiment of a VoIP telephone system having a second WAN connection;

FIG. 4 is a block diagram of a third embodiment of a VoIP telephone system having a VoIP service provider;

FIG. 5 is a block diagram of a fourth embodiment of a VoIP telephone system having a VoIP service provider and a secondary WAN; and FIG. 6 is a block diagram of a fifth embodiment of a VoIP telephone system having a VoIP service provider and two secondary WANs.

DETAILED DESCRIPTION

Figure 1:
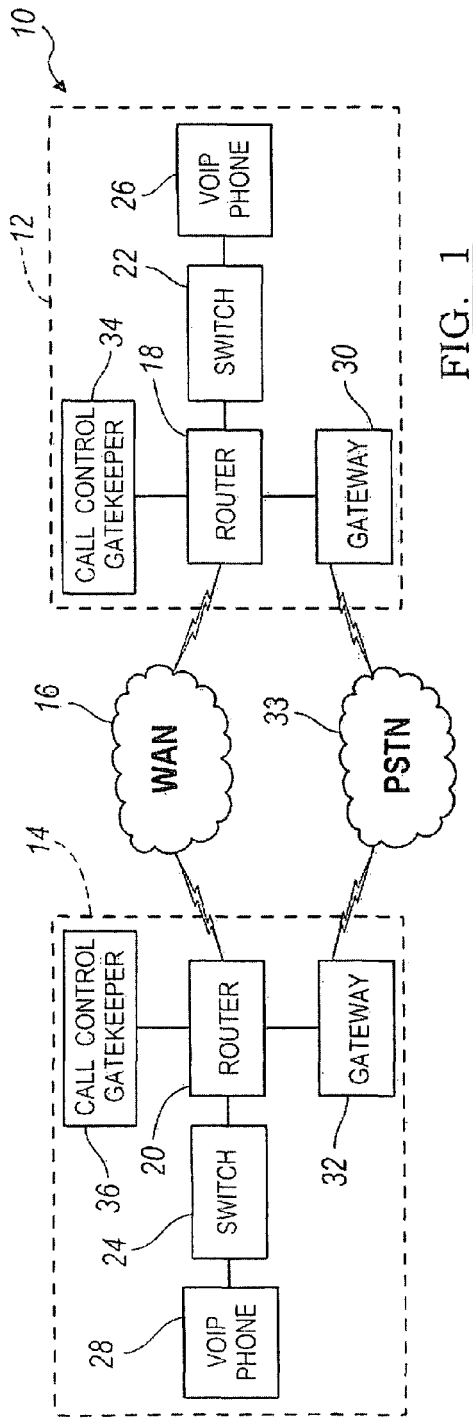
FIG. 1 is a block diagram of a first embodiment of VoIP telephone system embodying the principles of the present invention.

In one embodiment, a system for changing the coder-decoder ("codec") of a VoIP telephone call includes a WAN and two LANs connected to the WAN. The LANs each individually include a router for connecting the LAN to the WAN, a switch connected to the router and a VoIP telephone connected to the switch. When connected thusly, the VoIP telephones can communicate to each other via the WAN.

The VoIP telephones are configured to communicate to each other via voice packets. Additionally, the VoIP telephones can detect the amount of dropped voice packets occurring between the VoIP telephones during a telephone call. When the number of dropped voice packets surpasses a certain amount, the VoIP telephones are configured to renegotiate the telephone call and utilize a lower bandwidth codec.

The first and/or second LANs may further include a call control gatekeeper connected to the router and configured to receive a call quality signal from the VoIP telephone of the same LAN. When the gatekeeper receives this call quality signal, the gatekeeper will instruct the VoIP telephones to renegotiate the telephone call and utilized a lower bandwidth codec.

Alternatively, the WAN may have two lines of communication: a primary WAN and a backup WAN. If the primary WAN becomes inoperative, the backup WAN will provide the connection between the two LANs. In the event that the primary WAN becomes inoperative, the VoIP telephones will renegotiate the telephone call using a lower bandwidth codec. Alternatively, the call control gatekeeper may be configured to notify the VoIP telephones to renegotiate the telephone calls and renegotiate the telephone call and utilize a lower bandwidth codec when the primary WAN becomes inoperative.

In another embodiment of the system, the system includes a VoIP service provider system and two WANs connected to the VoIP service provider system. Connected to each WAN are separate LANs. Each LAN has a router connected to the WAN, a switch connected to the router and a VoIP telephone connected to the switch.

When one of the VoIP telephones detect a certain amount of voice packets being dropped, the VoIP telephones are configured to renegotiate the telephone call and utilize a lower bandwidth codec. Alternatively, the call control gatekeeper can be configured to receive a call quality control signal from the VoIP telephones. Once a call quality signal is received from the call control gatekeeper, the call control gatekeeper will instruct the VoIP telephones to renegotiate the telephone call and utilize a lower bandwidth codec.

Similar to the above, each of the WANs may be replaced with primary WAN and a backup WAN. Furthermore, the VoIP telephones and/or the call control gatekeeper can be configured to detect when the primary WAN becomes inoperative. When the primary WAN becomes inoperative, the VoIP telephones will renegotiate the telephone call and utilize a lower bandwidth codec.

These and other aspects and advantages of the present invention will become apparent upon reading the following detailed description of the invention in combination with the accompanying drawings.

Referring to FIG. 1, a VoIP telephone system 10 is shown. The VoIP telephone system 10 includes a first LAN 12 and a second LAN 14. The first and second LANs 12 and 14 communicate to each other via a WAN 16.

The first LAN 12 and second LAN 14 may be substantially similar or may be of different configurations. The first and second LANs 12 and 14 each include routers 18 and 20. The routers 18 and 20 function to connect the LANs 12 and 14 to the WAN 16. Connected to the routers 18 and 20 are switches 22 and 24, respectively. The switches 22 and 24 function to connect a variety of network devices such as VoIP telephones 26 and 28 as well as computers and printers to the routers 18 and 22 and eventually the WAN 16.

Additionally, gateway devices 30 and 32 may be connected to routers 18 and 20 respectively. The gateway devices 30 and 32 function to provide access to a public switched telephone network ("PSTN"). This allows the VoIP telephones 26 and 28 access to the traditional telephone network, thereby providing the ability to access 911 services and make local telephone calls.

Connected to the routers 18 and 20 are call control gatekeepers 34 and 36. The call control gatekeepers function to direct incoming voice packets to the proper VoIP telephone. Additionally, as will be explained later, the call control gatekeepers 34 and 36 may function to provide assistance in the adjusting the codec used during a VoIP telephone call between the VoIP telephones 26 and 28.

When making a VoIP telephone call between VoIP telephones 26 and 28, a codec will be utilized to convert the voice of the caller to a digital signal. There are many different codecs available for converting the voice of the caller to a digital signal. For example, the table below shows a variety of commonly used different codecs and their sampling bit rates.

| CODEC | BIT RATE |
|---|---|
| G.711 | 64 kbps |
| G.729 | 8 kbps |
| G.723.1 | 6.3 kbps |
| G.723.1 | 5.3 kbps |
| G.726 | 32 kbps |
| G.726 | 24 kbps |
| G.728 | 16 kbps |

As shown in the table above, using codec G.711 samples the analog voice of the caller at 64 kbps while codec G.729 samples at 8 kbps per second. By sampling at a higher rate, the quality of the voice heard by the listener of VoIP telephone will be superior. However, using a codec with a higher sampling rate requires a greater bandwidth to effectively transmit calls between VoIP telephones.

The VoIP telephones 26 and 28 are configured to communicate to each other via voice packets. Typically, these voice packets are sampled using a higher quality codec such as G.711. However, the VoIP telephones 26 and 28 are configured to determine the call quality. A determination indicating low call quality indicates that the available bandwidth is limited. When one of the VoIP telephones 26 and 28 determine that the call quality is low, the VoIP telephone detecting the dropped packets will signal to the other VoIP telephone to renegotiate the connection between the VoIP telephones. During this renegotiation of the VoIP telephones, the VoIP telephones 26 and 28 will select a codec using a lower sampling rate such as G.729. By utilizing a lower bandwidth codec, the amount of available bandwidth increases. By increasing the available bandwidth, more data, including additional VoIP telephone calls can be transmitted.

There are several ways to determine call quality. One way that may be utilized is to measure the number of dropped voice packets over a given time period. Once this measurement surpasses a certain threshold, the VoIP telephones 26 and 28 will determine that the call quality is low. Another way to measure call quality is by measuring the amount of time a voice packet takes to travel from one destination to another (latency). If the amount of time surpasses a certain threshold, the VoIP telephones 26 and 28 will determine that the all quality is low. Another way to measure call quality is to measure variations in one or more signal characteristics (jitter), such as the interval between successive pulses, the amplitude of successive cycles or the frequency or phase of successive cycles. These three ways of determining call may be used separately or in any combination. Further, other ways of determining call quality may be utilized.

Alternatively, the gatekeepers 34 and 36 may be configured to receive a call quality signal from their respective VoIP telephone 26 and 28. When one of the call control gatekeepers 34 and 36 receive a call quality signal indicating that voice packets are being dropped, the call control gatekeeper 34 or 36 will instruct the VoIP telephone 26 and 28 to renegotiate with the other VoIP telephone 26 or 28 to renegotiate the telephone call and select a codec with a lower sampling rate.

Figure 2:
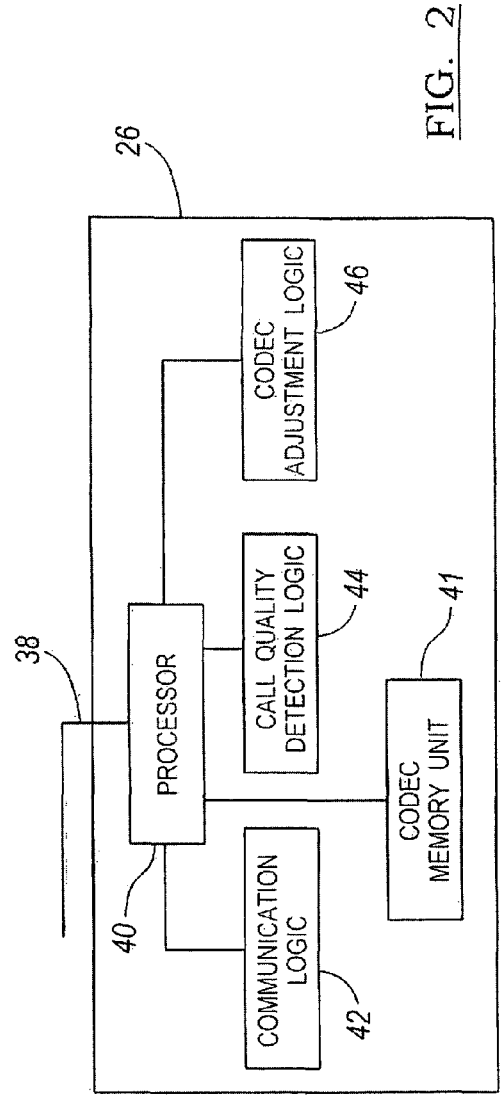
FIG. 2 is a block diagram of a VoIP telephone embodying the principles of the present invention.

Referring to FIGS. 1 and 2, a detailed block diagram of the VoIP telephone 26 is shown. The VoIP telephone 26 includes an interface 38 for connecting to the switch 24. Located within the VoIP telephone 26 is a processor 40 which is connected to the interface 38. Connected to the processor 40 is a memory unit 41 having a plurality of codec algorithms located within. Also connected to the processor 40 is communication logic 42, a call quality connection logic 44 and a codec adjustment logic 46. The logics 42, 44 and 46 may be programmed using any number of programming languages such as C++. When in operation, the processor 40 will communicate with the second VoIP telephone 28 (as best shown in FIG. 1) using a first codec. The codec used during the telephone call is stored in the memory unit 41. The processor may be a TMS3201 of Texas Instruments Incorporated of Dallas, Tex.

The communication logic 42 is executable by the processor 40 and configures the processor to communicate with the second VoIP telephone 28 using one of the codec's stored in the memory unit 41. The call quality detection logic 44 is configured to be executed by the processor 40 and configures the processor to detect the call quality between the processor and the second VoIP telephone using the previously described call quality methods. The codec adjustment logic 46 is also executable by the processor 40. The codec adjustment logic 46 configures the processor to communicate with the second VoIP telephone using a second codec which is also stored in the memory unit 41. The codec adjustment logic configures the processor to change codecs based on the detected call quality.

Referring to FIG. 3, a second embodiment of the VoIP telephone system 10 is shown. Similar reference numerals are used to indicate similar elements. In this embodiment, the WAN 16 of FIG. 1 has been replaced with a primary WAN 17 and a backup WAN 19. Similar to the WAN 16 of FIG. 1, the primary WAN 17 functions to provide communications between the first LAN 12 and the second LAN 14. The backup WAN 19 functions to provide a backup line of communication between the first LAN 12 and the second LAN 14. Preferably, the second WAN 19 has a bandwidth less that the primary WAN 17. If the primary WAN 17 becomes inoperable, the backup WAN 19 will be utilized to provide a limited bandwidth communication line between the LANs 14 and 16.

The VoIP telephones 26 and 28 are configured to detect if the primary WAN 17 becomes inoperative. In the event that the primary WAN 17 becomes inoperative, the VoIP telephone 26 and 28 will renegotiate and use a lower bandwidth codec.

Alternatively, the call control gatekeepers 34 and 36 can be configured to detect when the primary WAN 17 becomes inoperative. In the event that the primary WAN 17 becomes inoperative, one of the call control gatekeepers 34 and 36 can indicate to their VoIP telephone 26 and 28 that the primary WAN is inoperative. Once the VoIP telephones 26 and 28 have been informed that the primary WAN 17 is inoperative, the VoIP telephones 26 and 28 will negotiate the telephone call using a lower bandwidth codec.

Referring to FIG. 4, a third embodiment of the VoIP telephone system 10 is shown. Similar to FIG. 1, the VoIP telephone system 10 includes a first LAN 12 and a second LAN 14. However, the first and second LANs 12 and 14 are connected to a first and second WANs 48 and 50, respectively. The first and second WANs 48 and 50 are connected to a VoIP service provider system 51 via one or more interfaces (not shown). The VoIP telephones 26 and 28 will communicate to each other via the VoIP service provider system 52 through the first WAN 58 and the second WAN 50.

The VoIP service provider system includes a VoIP service provider subsystem 42. A call control gatekeeper 54 is connected to the VoIP service provider subsystem 52. The call control gatekeeper 54 functions to correctly instruct the service provider subsystem 42 to direct VoIP telephone calls to the intended VoIP telephone.

The VoIP telephones 26 and 28 are configured to detect when voice packets are dropped during a VoIP telephone call. When voice packets are dropped, the VoIP telephones 26 and 28 will negotiate the VoIP telephone calls and change to a lower band with codec.

Alternatively, the call control gatekeeper 54 may be configured to receive a signal from either the VoIP telephones 26 and 28 indicating that voice packets are being dropped. When the call control gatekeeper 54 receives this signal, the call control gatekeeper 54 will instruct the VoIP telephones 26 and 28 to renegotiate the VoIP telephone calls and utilize a lower bandwidth codec.

Referring to FIG. 5, a fourth embodiment of the VoIP telephone system 10 is shown. In this embodiment, the first WAN 48 of FIG. 3 has been replaced by a primary WAN 56 and a backup WAN 58. Like the first WAN 38 of FIG. 3, the primary and backup WANs 56 and 58 function to connect the first LAN to the VoIP service provider system 52. The primary WAN 56 has a greater bandwidth than the backup WAN 58. When the primary WAN 56 is inoperative, the backup WAN 58 will serve to transmit data between the first WAN 48 and the VoIP service provider system 52.

The VoIP telephone 26 is configured to detect when the primary WAN 56 is inoperative. Alternatively, the VoIP telephone may be configured to receive a signal indicating that the primary WAN 56 is inoperative. When the primary WAN 56 is inoperative, the VoIP telephone 26 will renegotiate the VoIP telephone call with the VoIP telephone 28 and utilize a lower bandwidth codec.

Referring to FIG. 6, a fifth embodiment of the VoIP telephone system 10 is shown. In this embodiment the second WAN 30 of FIG. 4 has been replaced by a second primary WAN 60 and a second backup WAN 62. The second backup WAN 62 and the second primary WAN 60 function to connect the second local area network 14 to the VoIP service provider 52. In the event the second primary WAN 50 is inoperative, the second backup WAN 62 will provide a connection path between the second LAN 14 and the VoIP service provider 52.

The VoIP telephone 28 is configured to detect when the second primary WAN 60 becomes inoperative. In the event that the secondary primary WAN 60 becomes inoperative, the VoIP telephone 28 will renegotiate the VoIP telephone call with the VoIP telephone 26 and utilize a lower bandwidth codec.

Alternatively, the call control gatekeeper 54 may be configured to detect when the second primary WAN 60 becomes inoperative. When the second primary WAN 60 becomes inoperative, the call control gatekeeper 54 will signal the VoIP telephones 26 and 28 to renegotiate the VoIP telephone call and utilize a lower bandwidth codec.

Figure 7:
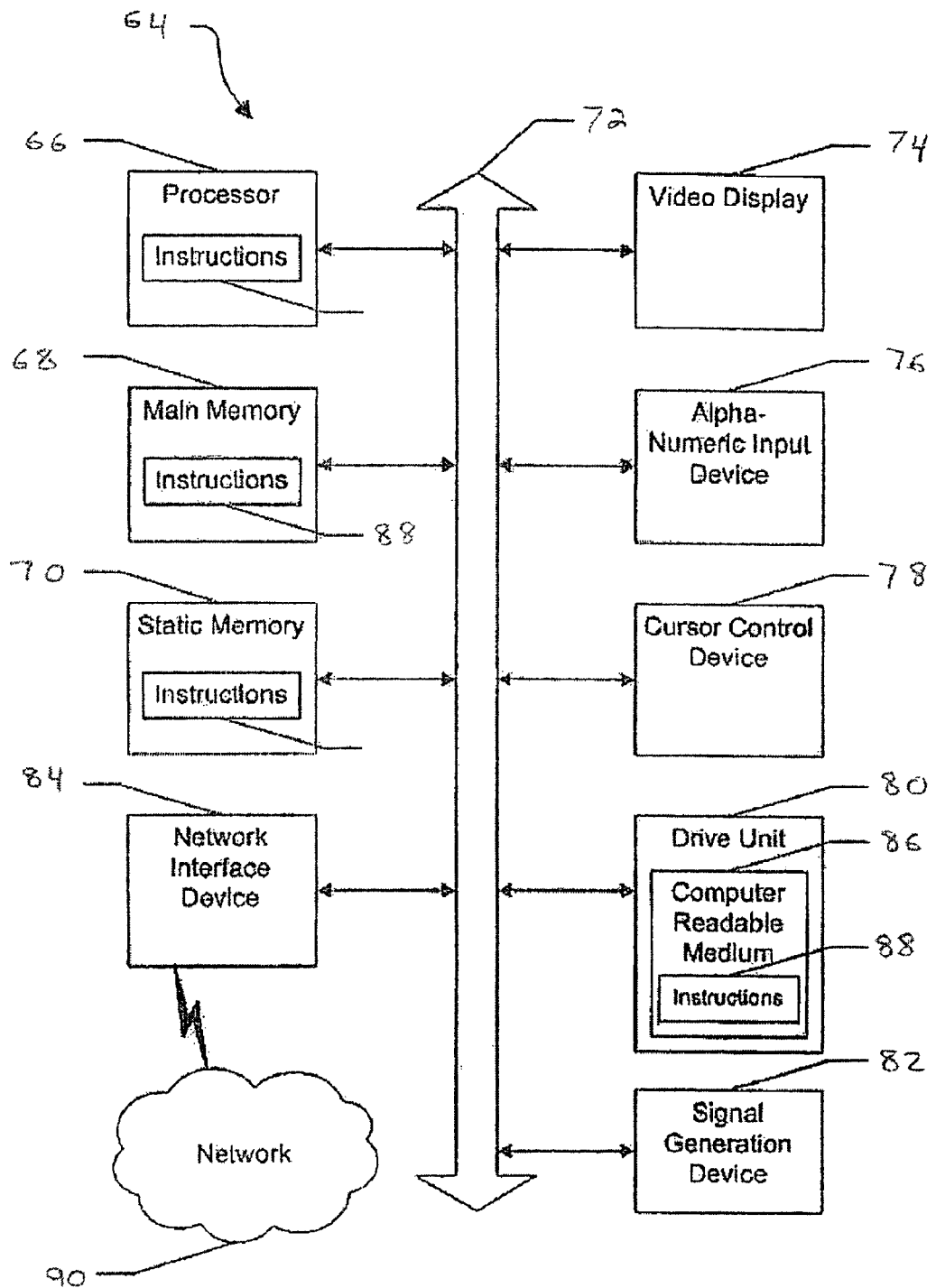
FIG. 7 is a block diagram of a general purpose computer.

Referring to FIG. 7, an illustrative embodiment of a general computer system is shown and is designated 64. The computer system 64 can include a set of instructions that can be executed to cause the computer system 64 to perform any one or more of the methods or computer based functions disclosed herein. The computer system 64 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 64 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 64 can be implemented using electronic devices that provide voice, video or data communication. Further, while a single computer system 64 is illustrated, the term "system" shall also be taken to include any collection of systems or sub-systems that individually or jointly execute a set, or multiple sets, of instructions to perform one or more computer functions.

As illustrated in FIG. 7, the computer system 64 may include a processor 66, e.g., a central processing unit (CPU), a graphics processing unit (GPU), or both. Moreover, the computer system 64 can include a main memory 68 and a static memory 70 that can communicate with each other via a bus 72. As shown, the computer system 64 may further include a video display unit 74, such as a liquid crystal display (LCD), an organic light emitting diode (OLED), a flat panel display, a solid state display, or a cathode ray tube (CRT). Additionally, the computer system 64 may include an input device 76, such as a keyboard, and a cursor control device 78, such as a mouse. The computer system 64 can also include a disk drive unit 80, a signal generation device 82 such as a speaker or remote control, and a network interface device 84.

In a particular embodiment, as depicted in FIG. 7, the disk drive unit 80 may include a computer-readable medium 86 in which one or more sets of instructions 88, e.g. software, can be embedded. Further, the instructions 88 may embody one or more of the methods or logic as described herein. In a particular embodiment, the instructions 88 may reside completely, or at least partially, within the main memory 68, the static memory 70, and/or within the processor 66 during execution by the computer system 64. The main memory 68 and the processor 66 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 88 or receives and executes instructions 88 responsive to a propagated signal, so that a device connected to a network 90 can communicate voice, video or data over the network 90. Further, the instructions 88 may be transmitted or received over the network 90 via the network interface device 84.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A system comprising:
   a VoIP service provider system having a call control gatekeeper, a first interface and a second interface;
   the first interface connected to a first LAN having an interface to a first VoIP telephone;
   the second interface connected to a second LAN having an interface to a second VoIP telephone;
   the first and second VoIP telephones being configured to communicate using a first codec;
   the call control gatekeeper configured to receive a call quality signal from the first VoIP telephone and send an adjustment signal based on the call quality signal to the first and second VoIP telephones instructing the first and second VoIP telephones to communicate using a second codec; and
   wherein the adjustment signal based on the call quality signal is sent to the first and second VoIP telephones during a telephone call between the first and second VoIP telephones.

2. A system comprising:
   a VoIP service provider system having a call control gatekeeper, a first interface and a second interface;
   the first interface connected to a first LAN having an interface to a first VoIP telephone;
   the second interface connected to a second LAN having an interface to a second VoIP telephone;
   the first and second VoIP telephones being configured to communicate using a first codec;
   the call control gatekeeper configured to receive a call quality signal from the first VoIP telephone and send an adjustment signal based on the call quality signal to the first and second VoIP telephones instructing the first and second VoIP telephones to communicate using a second codec; and
   wherein the call quality signal is based upon a number of dropped voice packets during a VoIP telephone call.

3. A system comprising:
a VoIP service provider system having a call control gatekeeper, a first interface and a second interface;
the first interface connected to a first LAN having an interface to a first VoIP telephone;
the second interface connected to a second LAN having an interface to a second VoIP telephone;
the first and second VoIP telephones being configured to communicate using a first codec;
the call control gatekeeper configured to receive a call quality signal from the first VoIP telephone and send an adjustment signal based on the call quality signal to the first and second VoIP telephones instructing the first and second VoIP telephones to communicate using a second codec; and
a primary WAN and a secondary WAN connection between the first LAN and the VoIP service provider system for connecting the first LAN to the VoIP service provider system, the secondary WAN provides a backup connection when the call quality signal indicates that the primary WAN is inoperative.

4. The system of claim 3, wherein a bandwidth of the secondary WAN is less than a bandwidth of the primary WAN.

5. The system of claim 3, wherein the call control gatekeeper is configured to detect and send an adjustment signal to the VoIP telephones instructing the VoIP telephones to change the codec of the VoIP telephone call when the primary WAN is inoperative.

6. A system comprising:
a VoIP service provider system having a call control gatekeeper, a first interface and a second interface;
the first interface connected to a first LAN having an interface to a first VoIP telephone;
the second interface connected to a second LAN having an interface to a second VoIP telephone;
the first and second VoIP telephones being configured to communicate using a first codec;
the call control gatekeeper configured to receive a call quality signal from the first VoIP telephone and send an adjustment signal based on the call quality signal to the first and second VoIP telephones instructing the first and second VoIP telephones to communicate using a second codec;
a public switched telephone network; and
a gateway in communication with the router of the first LAN and the public switched telephone network, the gateway configured to provide access to the public switched telephone network from the VoIP telephone of the first LAN.

7. A system for changing a codec of a VoIP telephone call, the system comprising:
a primary WAN;
a first LAN in communication with the primary WAN;
a second LAN in communication with the primary WAN;
the first and second LANs each individually having a router, a switch in communication with the router and an interface to a VoIP telephone in communication with the switch, where the primary WAN transmits voice packets of a VoIP telephone call between the VoIP telephones connected to the interfaces of the first and second LANs;
the VoIP telephones connected to the interfaces of the first and second LANs are configured to communicate to each other using voice packets, measure the quality of the VoIP telephone call and change a codec of the VoIP telephone call based on a measured quality of the VoIP telephone call; and
wherein the quality of the VoIP telephone call is measured by a number of dropped voice packets.

8. A system for changing a codec of a VoIP telephone call, the system comprising:
a primary WAN;
a first LAN in communication with the primary WAN;
a second LAN in communication with the primary WAN;
the first and second LANs each individually having a router, a switch in communication with the router and an interface to a VoIP telephone in communication with the switch, where the primary WAN transmits voice packets of a VoIP telephone call between the VoIP telephones connected to the interfaces of the first and second LANs;
the VoIP telephones connected to the interfaces of the first and second LANs are configured to communicate to each other using voice packets, measure the quality of the VoIP telephone call and change a codec of the VoIP telephone call based on a measured quality of the VoIP telephone call; and
wherein the first LAN further comprises a call control gatekeeper in communication with the router configured to receive a call quality signal from the VoIP telephone of the first LAN and send an adjustment signal based on the call quality signal to the VoIP telephones instructing the VoIP telephones to change the codec of the VoIP telephone call.

9. A system for changing a codec of a VoIP telephone call, the system comprising:
a primary WAN;
a first LAN in communication with the primary WAN;
a second LAN in communication with the primary WAN;
the first and second LANs each individually having a router, a switch in communication with the router and an interface to a VoIP telephone in communication with the switch, where the primary WAN transmits voice packets of a VoIP telephone call between the VoIP telephones connected to the interfaces of the first and second LANs;
the VoIP telephones connected to the interfaces of the first and second LANs are configured to communicate to each other using voice packets, measure the quality of the VoIP telephone call and change a codec of the VoIP telephone call based on a measured quality of the VoIP telephone call;
a secondary WAN in communication with the routers of the first and second LANs for transferring the voice packets between the VoIP telephones when the primary WAN is inoperative; and
the VoIP telephones being configured to detect when the primary WAN is inoperative and change the codec of the VoIP call when the call quality signal indicates that the primary WAN is inoperative.

10. The system of claim 9, wherein the first LAN further comprises a call control gatekeeper configured to receive a call quality signal from the VoIP telephone of the first LAN and send an adjustment signal based on the call quality signal to the VoIP telephones instructing the VoIP telephones to change the codec of the VoIP telephone call.

11. A system for changing a codec of a VoIP telephone call, the system comprising:
a primary WAN;
a first LAN in communication with the primary WAN;
a second LAN in communication with the primary WAN;
the first and second LANs each individually having a router, a switch in communication with the router and an interface to a VoIP telephone in communication with the switch, where the primary WAN transmits voice packets of a VoIP telephone call between the VoIP telephones connected to the interfaces of the first and second LANs;

the VoIP telephones connected to the interfaces of the first and second LANs are configured to communicate to each other using voice packets, measure the quality of the VoIP telephone call and change a codec of the VoIP telephone call based on a measured quality of the VoIP telephone call; and wherein the bandwidth of the primary WAN is greater than the bandwidth of the primary WAN.

12. A system for changing a codec of a VoIP telephone call, the system comprising:

a primary WAN;

a first LAN in communication with the primary WAN;

a second LAN in communication with the primary WAN;

the first and second LANs each individually having a router, a switch in communication with the router and an interface to a VoIP telephone in communication with the switch, where the primary WAN transmits voice packets of a VoIP telephone call between the VoIP telephones connected to the interfaces of the first and second LANs;

the VoIP telephones connected to the interfaces of the first and second LANs are configured to communicate to each other using voice packets, measure the quality of the VoIP telephone call and change a codec of the VoIP telephone call based on a measured quality of the VoIP telephone call;

a public switched telephone network; and a gateway in communication with the router of the first LAN and the public switched telephone network, the gateway configured to provide access to the public switched telephone network from the VoIP telephone of the first LAN.

* * * * *